ދ3,236,870
THERMALLY STABLE POLYMERS
Wiley M. Branan, Penns Grove, N.J., and John A. Parkins, Newark, Del., assignors to E. I. du Pont de Nemours and Company, Wilmington, Del., a corporation of Delaware
No Drawing. Filed May 8, 1961, Ser. No. 108,239
2 Claims. (Cl. 260—446)

This application is a continuation-in-part of our application Serial No. 25,190, filed April 28, 1960, now abandoned.

The present invention relates to the production of novel liquid phosphonitrilic chloride polymers modified by antimony halides.

The preparation of phosphonitrilic chlorides by the reaction of phosphorus pentachloride and ammonium chloride in sym-tetrachloroethane is known. Generally, the reaction product is a mixture of crystalline and liquid polymers having various degrees of polymerization. Because the liquid fraction of the polymers is liquid over a wide temperature range, i.e., from 0° C. to about 250° C., it is useful not only as an additive, but as a lubricant, chemical intermediate, and as a working fluid in applications requiring a liquid having a wide range between the freezing and boiling point. However, it is well known in the art that when the liquid phosphonitrilic chlorides are heated in air at a temperature between about 250 to about 350° C., a highly polymerized rubbery product results. Unfortunately, temperatures as high as 250° C. are sometimes encountered in the zone of moving mechanical parts. The deleterious effect on moving mechanical parts as a result of the further polymerization of the liquid polymeric phosphonitrilic chloride lubricant to a rubbery solid is obvious.

Therefore, a need exists for the modification of the phosphonitrilic chloride polymers to obtain products which will not polymerize to rubbery products at the temperatures at which the unmodified polymers further polymerize, i.e., between 250 and 350° C. Accordingly, it is an object of this invention to prepare modified liquid phosphonitrilic chloride polymers which will not further polymerize to a rubbery solid when heated at a temperature of at least 250° C. and which, in some cases, are stable at temperatures as high as 574° C.

We have found that the foregoing object is achieved when we prepare a polymeric composition by adding antimony chlorides to the phosphorus pentachloride, ammonium chloride, and sym-tetrachloroethane reaction medium in such proportions as to provide the desired final composition.

In accordance with this invention, polymers stable at temperatures of 250° C. and above are prepared by refluxing in sym-tetrachloroethane, phosphorus pentachloride, ammonium chloride, and either antimony pentachloride or antimony trichloride, separating the reaction products from the solids and the solvent, and isolating the liquid reaction product. At least one mole, and preferably about 1.5 moles, of ammonium chloride and from 0.05 to 0.1 mole of antimony pentachloride or from 0.05 to 1.0 mole of antimony trichloride should be present for each mole of phosphorus pentachloride in the refluxing solvent.

We have unexpectedly found that with specified amounts of antimony pentachloride or trichloride, these compounds are incorporated in the phosphonitrilic chloride polymer system and extremely useful products having different properties result therefrom.

The following examples illustrate the preparation of the novel compositions of the invention. However, the examples are intended to be illustrative only and are not construed as limiting the invention in any manner.

Example 1

A suspension of 400 parts (1.92 moles) of phosphorus pentachloride and 150 parts (2.82 moles) of ammonium chloride in 1600 parts of sym-tetrachloroethane was heated to 110° C. and then 53 parts (0.23 mole) of antimony trichloride was added. The suspension was refluxed for 23 hours and cooled. The unreacted ammonium chloride was removed by filtration and sym-tetrachloroethane then was removed by vacuum distillation. The remaining crude product was filtered in an atmosphere of dry argon to give 120 parts of liquid antimony-containing phosphonitrilic chloride polymer and 102 parts of crystalline phosphonitrilic chloride containing no antimony halide. Elemental analysis of the liquid product gave an approximate empirical formula of

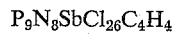

$P_9N_8SbCl_{26}C_4H_4$

|  | P | N | Sb | Cl | C | H | Mol. Wt. |
|---|---|---|---|---|---|---|---|
| Calculated, percent | 18.7 | 7.5 | 8.2 | 61.9 | 3.2 | 0.3 | 1,488 |
| Found, percent | 18.7 | 7.2 | 7.6 | 60.1 | 2.4 | 0.4 | 1,430 |

It was established by distillation, adsorption column chromatography, and vapor-phase chromatography that this liquid contained no unreacted antimony trichloride. The structure of the product is suggested as:

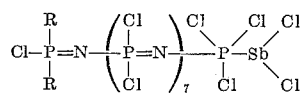

where R is —CH(Cl)CH(Cl$_2$) and the two R groups may be bonded to any of the eight phosphorus atoms at random. The R group is a residue of sym-tetrachloroethane.

When the above antimony chloride-containing phosphonitrilic chloride product was subjected to heating in air at the temperatures at which unmodified phosphonitrilic chloride polymers polymerize further, i.e., 250–350° C., for four hours (heating was discontinued after this period only because no chemical or physical change occurred up to this time), the product was stable and did not undergo further polymerization to a rubbery solid. The liquid product was heated in air to a temperature as high as 574° C. before further polymerization to a rubbery solid occurred.

Example 2

A mixture of 208 parts (1.0 mole) of phosphorus pentachloride and 70 parts (1.3 moles) of ammonium chloride in 960 parts of sym-tetrachloroethane was heated to 60° C. and then 228 parts (1.0 mole) of antimony chloride was added. The mixture was refluxed (at approximately 150° C.) for six hours, cooled, and unreacted ammonium chloride was removed by filtration. The solvent was distilled off and 320 parts of a liquid product remained. This liquid was heated under vacuum to remove all components boiling below 347° C./0.38 mm. Hg (including unreacted antimony trichloride). Elemental analysis of the residue gave an approximate empirical formula of $P_6N_5SbCl_{18}C_2H_2$:

|  | P | N | Sb | Cl | C | H |
|---|---|---|---|---|---|---|
| Calculated, percent | 17.9 | 6.7 | 11.6 | 61.2 | 2.3 | 0.2 |
| Found, percent | 18.4 | 6.6 | 11.2 | 62.2 | 1.0 | 0.6 |

The structure of the product is suggested as:

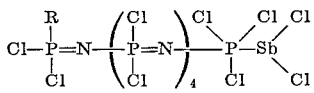

where R is —CH(Cl)CH(Cl$_2$) and the R group may be bonded to any of the 6 phosphorus atoms at random. As in Example 1, the R group is a residue of the sym-tetrachloroethane solvent.

When the above antimony chloride-containing product also was subjected to heating in air at 250° C.–350° C. for four hours, the product was stable and did not undergo further polymerization to a rubbery solid. Only upon heating to a temperature as high as 560° C. in air did the liquid product polymerize further to a rubbery solid.

*Example 3*

Phosphorus pentachloride (40 parts, 0.2 mole), 15 parts (0.28 mole) of ammonium chloride, and 4.5 parts (0.02 mole) of antimony trichloride were refluxed in 160 parts of sym-tetrachloroethane for a period of 20 hours. After the solids were removed by filtration and sym-tetrachloroethane was removed by vacuum distillation, the remaining semicrystalline crude product was filtered to give 12.4 parts of liquid phosphonitrilic chloride polymers having antimony trichloride incorporated therein and having a molecular weight of 1,430 and 9.5 parts of crystalline phosphonitrilic chloride containing no antimony halide.

This liquid antimony-containing product also was stable and did not undergo further polymerization when heated in air at 250–350° C. for more than seven hours.

*Example 4*

The procedure of Example 3 was followed except that 6.5 parts (0.02 mole) of antimony pentachloride was used instead of antimony trichloride. The semicrystalline crude product was filtered to give 15.7 parts of liquid phosphonitrilic chloride polymers having antimony pentachloride incorporated therein and 6.8 parts of crystalline phosphonitrilic chloride containing no antimony halide was obtained. The liquid antimony-containing product was stable and did not polymerize further upon heating at 250–350° C. for more than seven hours.

As shown in the foregoing examples, polymers of phosphonitrilic chloride modified by antimony trichloride or pentachloride have been prepared and have been shown to be stable and resist further polymerization to rubbery solids upon being heated to temperatures at which liquid unmodified phosphonitrilic chloride polymers (containing no antimony halide) generally polymerize further, i.e., temperatures between about 250° C. and 350° C. The following example shows the amount and type of product obtained when no antimony halide is used.

*Example 5*

The procedure of Example 3 was repeated and the same proportions of reactants were used except no antimony trichloride was present, only 6.1 parts of a liquid product having a molecular weight of 700 and 14.3 parts of crystalline phosphonitrilic chloride were obtained. Analysis of the liquid product indicated the following composition: N, 12.01%; P, 26.7%; Cl, 61.0%.

When the liquid product was heated in air at 260° C., it immediately polymerized further to a rubbery solid.

By the presence of a specified amount of antimony halide in the reaction mixture, not only are the liquid modified products stable at elevated temperatures of at least 250–350° C., and in some instances, 574° C., but also the more useful liquid fraction is obtained in greater quantities than that obtained from the mixtures in which no antimony halide is present. As can be seen by comparing Examples 3 and 4 with Example 5 in which the same amounts of phosphorus pentachloride and ammonium chloride were used, more than twice as much liquid product was obtained when antimony halides were present in the reaction mixture.

The amount of antimony pentachloride used in the preparation of the products of the invention is critical. The ratio of antimony pentachloride to phosphorus pentachloride must be between 0.05 and 0.1 mole per mole of phosphorus pentachloride. When more than 0.10 mole of antimony pentachloride is provided for each mole of phosphorus pentachloride, the desired product does not form. When less than 0.05 mole of antimony pentachloride is provided for each mole of phosphorus pentachloride, only the phosphonitrilic chloride polymer which contains no antimony pentachloride is formed.

The amount of antimony trichloride which is preferably used in the present invention is between 0.05 and 1.0 mole of antimony trichloride for each mole of phosphorus pentachloride. When less than 0.05 mole of antimony trichloride is provided for each mole of phosphorus pentachloride, no antimony trichloride-containing phosphonitrilic chloride polymer is formed. Amounts of antimony trichloride greater than 1.0 mole per mole of phosphorus pentachloride may be used; however, no advantage entails therefrom.

There are no preferred amounts of antimony trichloride or pentachloride within the specified ranges above. The amount of antimony halide employed depends on the type of liquid product desired. As can be seen in the examples, the higher the ratio of antimony halide to phosphorus pentachloride (within the specified range), the greater is the fraction of liquid product obtained. Also, the molecular weight of the final liquid product is dependent on the amount of antimony halide used within the specified range. The higher the ratio of antimony halide to phosphorus pentachloride (within the specified range), the lower will be the molecular weight of the final liquid product.

Although only the use of antimony trichloride or pentachloride has been exemplified in the preparation of the novel polymers of the invention, other halides of antimony may be applicable in the invention, for example, antimony trifluoride, tribromide, and triiodide.

The exemplified process of the invention is conventional except for the inclusion of the antimony halide in the reaction mixture of phosphorus pentachloride and ammonium chloride. Generally, the ammonium chloride is present in excess of one mole for each mole of phosphorus pentachloride, and the solvent-medium is sym-tetrachloroethane.

Generally, the process in accordance with the invention is effected at the reflux temperature of the reaction mixture and this is preferred. However, the reaction may be effected at higher temperatures under pressure, but the use of pressure is not preferred.

Depending on the amount of antimony halide present in the reaction mixture, the reaction product may be either a mixture of crystalline phosphonitrilic chloride and the desired liquid antimony halide-containing product or the liquid antimony halide-containing product alone. Any conventional method may be used for the separation of the liquid and crystalline fractions, for example, filtration, extraction, etc.

The incorporation of antimony pentachloride or trichloride in the phosphonitrilic chloride polymer system according to the invention is wholly unexpected and unpredictable from the teachings of the prior art. For example, Mellor, J. W., A Comprehensive Treatise on Inorganic and Theoretical Chemistry, 8, p. 724, teaches that antimony nitrilic chloride polymers could not be prepared and that the antimonic chloride is reduced to antimonous chloride.

The present invention has been described in detail in the foregoing. However, it will be apparent that many variations may be introduced without departure from the scope of the invention. We intend, therefore, to be limited only by the following claims.

We claim:

1. A process for preparing an antimony-containing liquid polymerized product which comprises heating at reflux temperature in sym-tetrachlorethane a mixture comprising phosphorus pentachloride, and, for each mole of said phosphorus pentachloride, at least one mole of ammonium chloride, and an antimony compound selected from the group consisting of antimony pentachloride in the amount of from 0.05 to 0.1 mole and antimony trichloride in the amount of from 0.05 to 1.0 mole, removing the solid material and sym-tetrachlorethane, and recovering the liquid product.

2. An antimony-containing liquid polymerized product, stable against further polymerization at 250° C., prepared according to the process of claim 1.

References Cited by the Examiner

UNITED STATES PATENTS 2,461,302  2/1949  Truhlar et al. _____ 117—138
2,728,691  12/1955  Beacham et al. _____ 117—138

FOREIGN PATENTS

Booth et al., J.A.C.S., vol. 65, pp. 1834–5 (1943).

Yost and Russell, Systematic Inorganic Chemistry, published by Prentice Hall, Inc. (1944), New York, pp. 108–109.

MAURICE A. BRINDISI, *Primary Examiner.*